United States Patent
Singh et al.

(10) Patent No.: US 10,587,514 B1
(45) Date of Patent: Mar. 10, 2020

(54) FILTERING CONTROL PLANE DECISION REQUESTS FOR FORWARDING NETWORK PACKETS

(71) Applicant: Amazon Technologies, Inc., Seattle, WA (US)

(72) Inventors: Bijendra Singh, Cedar Park, TX (US); Thomas A. Volpe, Austin, TX (US); Sundeep Amirineni, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/977,468

(22) Filed: Dec. 21, 2015

(51) Int. Cl.
*H04L 12/741* (2013.01)

(52) U.S. Cl.
CPC .................. *H04L 45/745* (2013.01)

(58) Field of Classification Search
CPC ................................................ H04L 45/745
See application file for complete search history.

(56) References Cited

U.S. PATENT DOCUMENTS

| | | | |
|---|---|---|---|
| 6,434,620 B1 * | 8/2002 | Boucher | H04L 29/06 709/230 |
| 6,574,240 B1 | 6/2003 | Tzeng | |
| 6,763,023 B1 | 7/2004 | Gleeson et al. | |
| 7,222,150 B1 * | 5/2007 | Phillips | H04L 29/06 709/202 |
| 7,224,668 B1 | 5/2007 | Smethurst et al. | |
| 7,325,134 B2 * | 1/2008 | Fascenda | H04L 9/3234 380/247 |
| 7,499,395 B2 | 3/2009 | Rahman et al. | |
| 8,103,781 B1 * | 1/2012 | Wu | H04L 61/103 709/223 |
| 8,149,866 B2 * | 4/2012 | Jreij | H04L 61/2015 370/389 |
| 8,205,252 B2 * | 6/2012 | Simon | H04L 12/66 380/261 |
| 8,233,488 B2 * | 7/2012 | Livescu | H04L 29/12462 370/395.31 |
| 8,493,977 B2 * | 7/2013 | Vempati | H04L 43/10 370/389 |
| 9,203,754 B2 * | 12/2015 | Akiyoshi | H04L 45/38 |
| 10,044,646 B1 * | 8/2018 | Detwiler | H04L 49/354 |
| 2003/0088721 A1 * | 5/2003 | Sharma | G06F 13/4036 710/112 |

(Continued)

*Primary Examiner* — Khaled M Kassim
*Assistant Examiner* — Thomas R Cairns
(74) *Attorney, Agent, or Firm* — Robert C. Kowert; Kowert, Hood, Munyon, Rankin & Goetzel, P.C.

(57) ABSTRACT

Packet processing pipelines may implement filtering of control plane decisions. When network packets are received various types of decision-making and processing is performed. In order to complete processing for the network packet, some decisions may need to be determined by a control plane for the packet processing pipeline, such as a general processor. Requests for control plane decisions for received network packets may be filtered prior to sending the requests to the control plane based on whether the same control plane decisions have been requested for previously received network packets. For control plane decisions with outstanding control plane decision requests, an additional control plane decision request for the network packet may be blocked, whereas control plane decisions with no outstanding control plane decision requests may be allowed.

20 Claims, 8 Drawing Sheets

(56) References Cited

U.S. PATENT DOCUMENTS

| | | |
|---|---|---|
| 2005/0147095 A1 | 7/2005 | Guerrero et al. |
| 2007/0127491 A1 | 6/2007 | Verzijp et al. |
| 2012/0195198 A1 | 8/2012 | Regan |
| 2014/0192646 A1 | 7/2014 | Mir et al. |
| 2015/0295885 A1* | 10/2015 | Congdon ............ H04L 61/2557 370/392 |
| 2016/0359673 A1* | 12/2016 | Gupta ................. H04L 63/1425 |
| 2016/0359743 A1* | 12/2016 | Dong ..................... G06F 13/00 |

* cited by examiner learn filter cache 500

| ingress port 510 | valid 512a | source MAC address 514a | ingress port 516a | learn request count 518a |
|---|---|---|---|---|
| | valid 512b | source MAC address 514b | ingress port 516b | learn request count 518b |
| | ⋮ | | | |
| ingress port 520 | valid 522a | source MAC address 524a | ingress port 526a | learn request count 528a |
| | valid 522b | source MAC address 524b | ingress port 526b | learn request count 528b |
| | ⋮ | | | |
| ⋮ | | | | |

FIG. 5 learn filter actions 600

| Source MAC Verfication Failure Status | Learn Filter Hit | Learn Filter Full | Learn Requests Sent to CPU Less Than Max | Learning Disabled | Static MAC | Action |
|---|---|---|---|---|---|---|
| Unknown Source MAC | Don't care | Don't care | Don't care | Yes | Don't care | Drop |
| Unknown Source MAC | Yes | Don't care | Yes | No | Don't care | Log or Trap |
| Unknown Source MAC | Yes | Don't care | No | No | Don't care | Forward or Drop |
| Unknown Source MAC | No | No | Don't care | No | Don't care | Log or Trap |
| Unknown Source MAC | No | Yes | Don't care | No | Don't care | Forward or Drop |
| Source MAC Moved | Don't care | Don't care | Don't care | Don't care | Yes | Drop |
| Source MAC Moved | Yes | Don't care | Yes | Don't care | No | Log or Trap |
| Source MAC Moved | Yes | Don't care | No | Don't care | No | Forward or Drop |
| Source MAC Moved | No | No | Don't care | Don't care | No | Log or Trap |
| Source MAC Moved | No | Yes | Don't care | Don't care | No | Forward or Drop |

FIG. 6

FILTERING CONTROL PLANE DECISION REQUESTS FOR FORWARDING NETWORK PACKETS

BACKGROUND

Network communications are foundational to the operation of many different systems and devices. Large public networks, such as the Internet, or smaller private networks, such as corporate intranets, facilitate communications between different systems or devices, from clients of services that provide storage, computing, or data delivery to hosting internal web sites or network tools accessible to a small number of users. Such networks utilize large numbers of networking devices to facilitate the fast and reliable delivery of data, network packets, from one system to another.

Leveraging the power of network communications has greatly increased the demand upon networking devices to receive, process, and send network packets. In turn, this increased demand has led to a greater need to increase the capacity and/or reduce the latency of processing network packets in a network. However, increasing networking device performance is not without cost. Powering devices to handle high workloads at great speed, for example, may be subject to various physical limitations, such as heat generated by power intensive networking devices, so that without certain power budgets or others limitations, networking devices may be unable to handle the workloads sustainably. Other limitations, such as chip area, may limit the amount of resources that may be applied to increase network processing capacity. Therefore, techniques that provide efficient utilization of networking device resources without sacrificing performance may be desirable.

BRIEF DESCRIPTION OF THE DRAWINGS

FIG. 5 is a logical block diagram illustrating a filter cache for tracking learn requests, according to some embodiments.

FIG. 6 is an action table for a learn filter, according to some embodiments.

Figure 1:
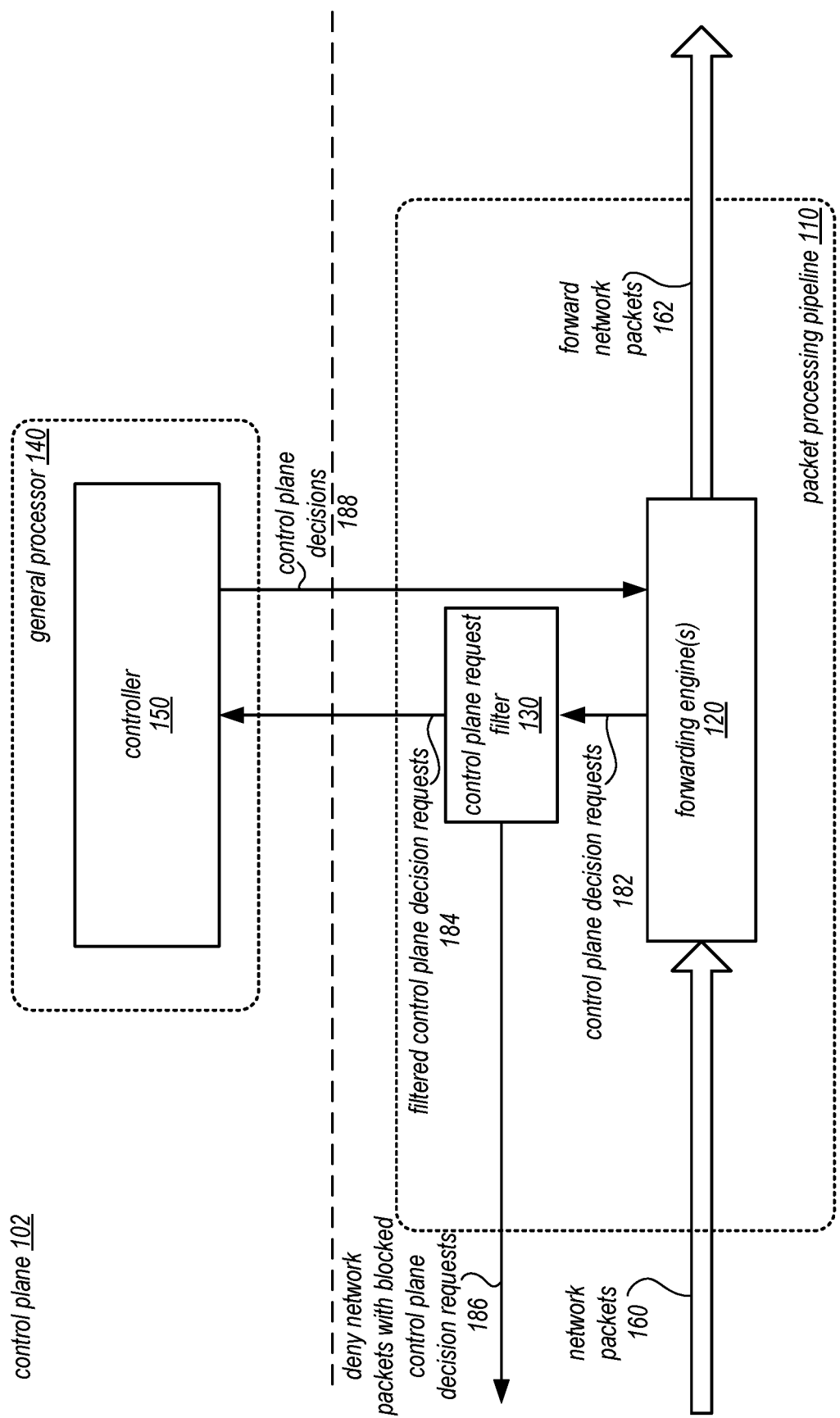
FIG. 1 illustrates a logical block diagram of filtering control plane decision requests for forwarding network packets, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described herein may implement filtering control plane decision requests for forwarding network packets. Network packets are packets of data (e.g., datagrams) sent across a network from a source networking device (e.g., a network interface card implemented at a computer or server) to a destination address representing an end networking device. The network may include many other networking devices, such as various kinds of switches, routers, network bricks, or any other device capable of receiving, processing, and/or sending the network packets across links between the networking devices in the network.

The path or route which a network packet travels may be determined according to forwarding decisions made at various networking devices in a network. A switch, for instance, may receive a network packet and make forwarding decisions with respect to the content of information in the network packet, such as various packet header fields. For example, a next hop address may be determined which identifies the next immediate destination to which the network packet may be sent. Once a forwarding decision is made, modifications to the packet may be performed, and the packet sent to a next networking device connected to the current networking device (or the networking packet may be dropped). Forwarding of the network packet may continue amongst the networking devices of a network until the network packet reaches the desired destination.

Networking devices generally include components, devices, or processes implemented as part of a data plane to forward network packets. A control plane may manage, direct, and/or configure forwarding routes and other information utilized by the data plane to make forwarding decisions. Typically a packet processing pipeline, such as may be implemented by a packet processor like packet processor 250 in FIGS. 2 and 3 below, may be implemented to perform data plane actions to forward network packets. A separate component, device or process, such as general processor like general processor 230 in FIGS. 2 and 3, may implement control plane actions including responding to requests for control plane decisions. Control plane requests and decisions may be any requests for processing, handling, or otherwise controlling the operation of the packet processing pipeline and may be triggered by receiving various kinds of network packets (e.g., Layer 2 network packets or control packets to configure network connections). For example, when network packets are received information included in the network packet may include a source Media Access Control (MAC) address. To determine a forwarding route for the network packet, the source MAC address may be verified to ensure that the source MAC address is known (or hash not changed physical network interfaces). If the source MAC address for a received network packet is unknown, then a request may be provided to the general processor to learn the appropriate action to be taken for network packets received from the source MAC address.

Requests for control plane decisions may be important for handling changing network conditions, reacting to malicious network events, such as denial of service attacks (DDOS), and other scenarios where the operation of the data plane may need to be changed or updated. In some of these circumstances, requesting control plane decisions may overburden the control plane with requests and may result in some repetitive requests for the same control plane decision (e.g., requests to learn the same source MAC address) squeezing out or preventing control plane decision requests for other control plane decisions that may need to be made. For example, malicious attacks that invoke repetitive configuration packets or messages which may need to be processed by the control plane can prevent legitimate control plane decision requests from being processed. Similarly, a Layer 2 topology loop or other network configuration, may result in control plane decision requests to learn a source MAC address being repeatedly requested. Implementing filtering of control plane decision requests for forwarding network packets may provide a fine-grained approach to prevent numerous requests for one control plane decision from effectively blocking control plane decision requests for other control plane decisions. (e.g., prevent requests to learn the same source MAC address from blocking control plane decision requests for other packets, such as requests to process Address Resolution Protocol (ARP) packets).

FIG. 1 illustrates a logical block diagram of filtering control plane decision requests, according to some embodiments. Control plane 102 may implement various management, configuration, routing, and other functions to that received network packets may be forwarded. Control plane 102 may be implemented at general processor 140 which may execute program instructions that execute a controller 150. Controller 150 may configure forwarding engine(s) 120 of packet processing pipeline 110 so that network packets processed in data plane 104 may be forwarded.

Figure 2:
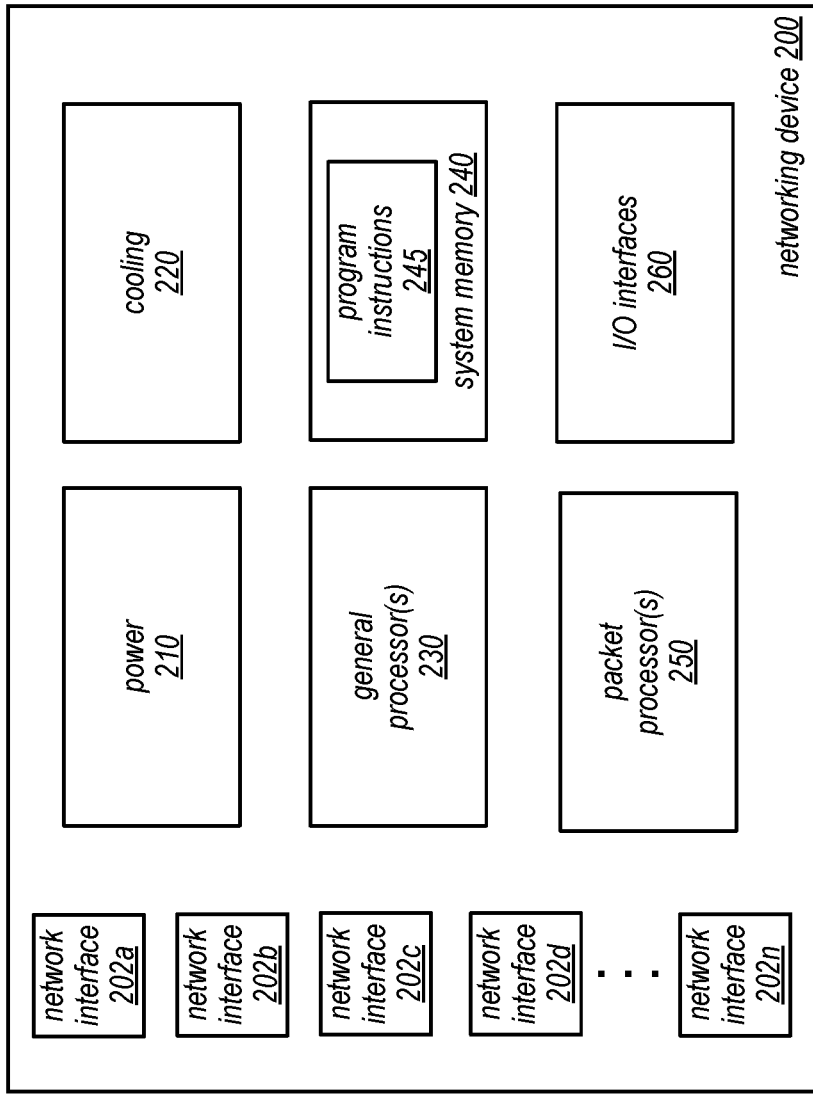
FIG. 2 is a logical block diagram illustrating a networking device that implements a packet processor, according to some embodiments.
Figure 3:
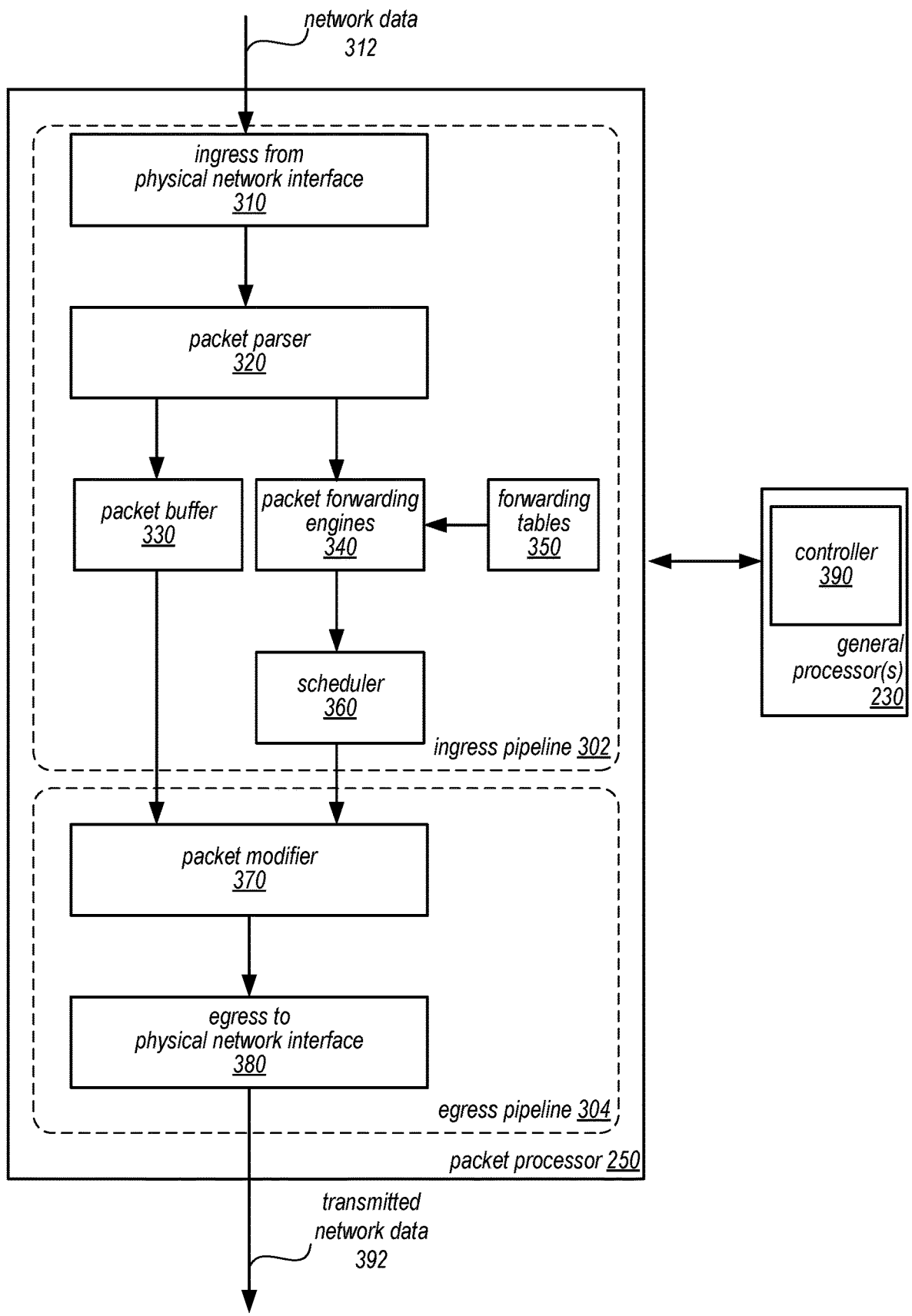
FIG. 3 is a logical block diagram illustrating a packet processor that process network packets utilizing aggregated common portions of forwarding routes, according to some embodiments.

Data plane 104 may be implemented by a device, such as packet processor 250 in FIGS. 2 and 3, to perform packet processing, including forwarding network packets. Packet processing pipeline 110 may implement one or more forwarding engines 120 to make forwarding engines for network packets 160 (e.g., such as a Layer 2 or Layer 3 forwarding engine). As network packets 160 are received at forwarding engine(s) 120, some control plane decisions may be needed in order to forward the network packets. Thus, control plane decision requests 182 may be attempted. Other network packets may be forwarded 162 to other networking devices.

Packet processing pipeline 110 may also implement control plane request filter 130 which may determine which ones of control plane decision requests 182 may be allowed or blocked, as discussed below with regard to FIG. 7. Control plane decision filter 130 may track or maintain control plane decision requests (e.g., as discussed below with regard to FIGS. 4-6) so that when control plane decision requests are received, those control plane decision requests which have not been sent to controller 150 may be allowed and those control plane decision requests for the same control plane decision (e.g., to learn the same source MAC address) may be blocked. In at least some embodiments, a request limit may be enforced, allowing a number of requests up to the request limit to be sent for a control plane decision before blocking subsequent control plane decision requests for the control plane decision. Filtered control plane decision requests 184 may be provided to controller 150, whereas the network packets of blocked control plane decision requests may be denied, as indicated at 186.

Once controller 150 makes control plane decisions, the control plane decision may be provided 188 to forwarding engine(s) 120 (e.g., by updating lookup table entries) so that the forwarding engine(s) 120 can forward subsequently received network packets 160 without having to request the same control plane decision. In some embodiments, entries for control plane decision request entries in a filter cache may be cleared, as discussed below with regard to FIG. 8.

Please note that the previous description of filtering control plane decision requests for forwarding network packets is not intended to be limiting but is provided as a logical example of control plane decision request filtering. The organization of components, entries, and other depicted items may be different than those illustrated in FIG. 1.

This specification begins with a general description of a networking device, which may utilize filtering control plane decision requests to perform forwarding of network packets at a packet processor. Then various examples of a packet processor are discussed, including different components/modules, or arrangements of components/modules that may be implemented, including components that perform filtering of control plane decision requests for forwarding network packets. A number of different methods and techniques to implement filtering control plane decision requests for forwarding network packets are then discussed, some of which are illustrated in accompanying flowcharts. Various examples are provided throughout the specification.

FIG. 2 is a logical block diagram illustrating a networking device that implements a packet processor, according to some embodiments. Networking device 200 may be a networking device configured to route, forward, or otherwise facilitate the communication of different devices, systems or networks via network connections to the networking device. A networking device may provide electrical and logical network connections. Networking devices may operate utilizing data included in different OSI layers, such as Layer 2 and Layer 3 to make forwarding determinations (e.g., to send a network packet received from one source connected to the switch to another source connected to the switch). Please note that networking devices, such as a switch, in some contexts (e.g., when discussing Layer 3 data) may be considered a type of router. Networking devices may also provide other services when facilitating communications, such as implementing network firewalls, network intrusion detection, and/or collecting metrics for performance analysis.

In at least some embodiments, networking device 200 may implement multiple network interfaces 202, which correspond to physical connections of different communication lines (e.g., twisted pair cables, coaxial cables, or fiber optic cables) connected to corresponding network interface ports. Network interfaces 202 may provide for different types, speeds, or other formats of network communication. For example, network interfaces 202 may provide different ports for 10 Gigabit, 40 Gigabit, or 100 Gigabit Ethernet cables. Many ports support multiple speeds, such as both 10 Gigabit and 100 Gigabit Ethernet connections.

Power 210 may be one or more power supplies that provide electricity to the various electrical components that draw upon power to perform operations (e.g., cooling 220, general processor(s) 230, system memory 240, packet processor(s) 250, and/or I/O interfaces 260. Cooling 220 may be one or more fan units implemented to circulate air and draw heat out of networking device 200.

Networking device 200 may include general processor(s) 230 which may include multiple cores (and which may be single or multi-threaded) coupled to a system memory 240 via an input/output (I/O) interface 260. Networking device 200 may be a uniprocessor system including one processor 230, or a multiprocessor system including several processors 230 (e.g., two, four, eight, or another suitable number). General processors 230 may be any suitable processors capable of executing instructions. For example, in various embodiments, processors 230 may be general-purpose or embedded processors implementing any of a variety of instruction set architectures (ISAs), such as the x86, PowerPC, SPARC, or MIPS ISAs, or any other suitable ISA. In multiprocessor systems, each of processors 230 may commonly, but not necessarily, implement the same ISA.

Networking device 200 includes one or more system memories 240 that are configured to store program instructions and data accessible by processor(s) 230. In various embodiments, system memories 240 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 240 may contain program instructions 245 that are executable by processor(s) 230 to implement various management functions and interfaces for networking device 200. In various embodiments, program instructions 245 may be encoded in platform native binary, any interpreted language such as Java™ byte-code, or in any other language such as C/C++, Java™, etc., or in any combination thereof.

In some embodiments, program instructions 245 may include instructions executable to implement an operating system (not shown), which may be any of various operating systems, custom or off the shelf operating systems. Any or all of program instructions 245 may be provided as a computer program product, or software, that may include a non-transitory computer-readable storage medium having stored thereon instructions, which may be used to program a computer system (or other electronic devices) to perform a process according to various embodiments. Program instructions 245 may also implement a controller that is configured to interface with packet processor(s) 250. For example, a controller may be configured to program memory devices with new or additional information (e.g., update next hop tables, action tables, insert or remove forwarding routes, etc.) or perform other control plane actions or make control plane decisions. Additionally, a controller may be able to access network packets trapped or logged by a packet processor 250 for further analysis and direct processing actions to be performed by packet processor 250 for the network packet.

A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system via an I/O interface. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system as system memory or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface.

Networking device 200 may implement one or multiple I/O interface(s) 260 to provide access to networking device 200 (e.g., to perform various switch management operations). In one embodiment, I/O interfaces 260 may be configured to coordinate I/O traffic between processor 230, system memory 245, packet processor(s) 250, and any peripheral devices in the system. In some embodiments, I/O interfaces 260 may perform any necessary protocol, timing or other data transformations to convert data signals from one component (e.g., system memory 245) into a format suitable for use by another component (e.g., processor 230). In some embodiments, I/O interfaces 260 may include support for devices attached through various types of peripheral buses, such as a variant of the Peripheral Component Interconnect (PCI) bus standard or the Universal Serial Bus (USB) standard, for example. In some embodiments, the functions of I/O interfaces 260 may be split into two or more separate components, such as a north bridge and a south bridge, for example. Also, in some embodiments, some or all of the functionality of I/O interfaces 260, such as an interface to system memory 240, may be incorporated directly into processors 230.

As noted in FIG. 2, one or more multiple packet processors 250 may be implemented to process data received via network interface(s) 202 at networking device 200. Packet processor(s) 250 may be implemented as dedicated hardware to perform various stages of packet processing for networking device 200. For example, packet processor(s) 250 may be implemented as an application specific integrated circuit (ASIC), field programmable gate array (FPGA), or other dedicated circuitry that performs packet processing, such as a System on a Chip (SoC). Packet processor(s) 250 may also be implemented as a software-based packet processing pipeline to perform various stages of packet processing for networking device 200 (e.g., via program instructions executing on one or more general processors 230). Packet processor(s) 250 may be assigned to one or multiple network interface(s) 202, performing dedicated processing of network data received via the assigned network interface(s) 202. FIG. 3 is a logical block diagram illustrating a packet processor that performs network packet tracing, according to some embodiments. Note that a packet processor may sometimes be referred to as a "network switch" (e.g., when implemented as a switch-on-a-chip). However, the term "network switch" is also commonly used to describe networking hardware, such as a switching hub, that may implement one or multiple packet processors as well as other hardware (such as discussed above with regard to networking device 200 in FIG. 2). Therefore, the term "packet processor" has been used herein to prevent confusion when referring to dedicated hardware for performing packet forwarding.

Packet processor 250 may implement multiple processing pipelines to output a processed network packet. For example, as illustrated in FIG. 3, ingress pipeline 302 and egress pipeline 304 may be implemented to provide forwarding of network packets as part of the data plane so that forwarding may be performed without software-based techniques. Ingress pipeline 302 may include different components, units, or stages, such as an ingress unit from a physical network interface 310, a packet parser 320, a packet buffer 330, packet metadata lookups 340, and scheduler 350. Ingress pipeline 302 may also access packet tables 350 and other packet routing information. Egress pipeline 304 may include a packet modifier 370 with access to other packet modification data, and an egress unit to physical network interface 390.

As data is received from network interfaces, ingress unit 310 may provide a physical layer (PHY) interface and Ethernet Media Access Control (MAC) layer interface. These interfaces may evaluate a stream of network data 312 (e.g., bit stream) received at packet processor 250 to detect valid streams and segment the stream into datagrams (e.g., packets/frames). For instance, the PHY layer may receive and transmit data across physical connections (e.g., such as electrical signals received over twisted pair or coaxial cable or optical signals received over optical fiber) at network interfaces 202. The PHY layer may implement different techniques dependent on the speed or type of network interface configured (e.g., Ethernet 10BASE-T, 100BASE-TX, and 1000BASE-T forms), such as encoding, multiplexing, synchronization, clock recovery and data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), inter-frame gap enforcement, and frame preambles.

Packet parser 320 may receive a network packet from ingress 310 and separate the packet header from the packet payload. The payload of the packet may be stored in packet buffer 330. Packet parser 320 may parse the packet header to determine and/or extract data for making a forwarding decision for the packet. For example, packet parser 320 may extract different layer headers (e.g., L2, L3, and L4 headers) included in an Internet Protocol (IP) version 4 packet, such as the source MAC address, the destination MAC address, the source IP address, the destination IP address, and port numbers. The extracted data may then be utilized to perform lookups to make forwarding decisions at packet forwarding engines 340.

Packet forwarding engines 340 may access data stored in packet tables 350 to make forwarding and tunneling decisions for the network packet based on information in the packet header (e.g., packet metadata) extracted by packet parser 320. For example, packet forwarding engines 340 may perform lookups for data in layer 2 (L2) portions of the packet to perform L2 forwarding. L2 forwarding may access a MAC address table in packet tables 350 perform two lookups (which may be in parallel). The first lookup may be performed with a key extracted from the packet header at packet parser 320 (e.g., a VLAN and source MAC address), to determine whether an entry for the packet is present in the MAC address table. If the source MAC address is unknown, then a mapping determination may be made to map the source MAC address to a port identified in the packet header. If the MAC address is known but attached to a different port than indicated in the MAC address table, then an operation may be performed to move the source MAC address to the port identified in the packet header. Otherwise the MAC address is known in the MAC address table. Another lookup to the MAC address table may also be performed with another key (e.g., the VLAN and the destination MAC address). The network packet may be routed if the MAC address table contains an entry for the destination MAC address owned by the networking device 200 (otherwise other operations may be performed, such as trapping the network packet for the CPU, bridging the packet out of a listed interface, or flooded out of all ports in an STP forwarding state).

Similarly, packet forwarding engines 340 may also perform lookups for data in layer 3 (L3) portions of the packet to perform L3 forwarding, such as L3 forwarding engine 400 discussed in FIG. 4 below, in some embodiments. For example, internet protocol (IP) headers for the packet may be evaluated with respect to entries in tables, such as a routing or next hop table, to determine forwarding to be performed. Please note that the previous examples of packet forwarding engines 340 is not exhaustive, as many other forwarding decisions may be made, including, but not limited to, forwarding engines for spanning tree protocol (STP) state checking, access port virtual LAN (VLAN) handling, VLAN membership checking, MAC2ME lookup, broadcast/multicast forwarding to a host CPU for the switch (e.g., CPU(s) 230), tunnel start/termination lookup, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and/or various other destination resolution lookups. As packet forwarding engines 340 make forwarding decisions about the packet (e.g., for L2, L3 and/or tunneling), the decisions are maintained as packet metadata. The packet metadata may be provided to scheduler 360 for scheduling determinations.

As discussed above, packet tables 350 may be implemented in one or multiple storage devices, such as various memory devices (e.g., a content associative memory (CAM), such as a ternary CAM, and/or random access memory (RAM), such as a static RAM) to store table data for performing different routing decisions. Tables may include a VLAN table, MAC address table, routing table, adjacency table, next hop table, tunnel start table, tunnel termination table, and/or actions table. Each of these different tables may be utilized to retrieve or determine packet forwarding decisions, tunneling decisions, and associated modifications that may need to be made to network packets. Controller 390 may modify packet tables 350 to change forwarding decision performs for network packets. For example, in some embodiments, control plane decisions may result in changes to packet tables, such as adding a new entry in a source MAC address table).

Scheduler 360 may control the buffering of packets and scheduling of operations within packet processor 250. For example, scheduler 360 may implement a memory management unit to allocate available memory segments in packet buffer 330 to store packets to be buffered. If a packet needs to be buffered (e.g., because the egress interface is congested), scheduler 360 may store the packet in a private pool of memory assigned to a particular physical interface port for the packet or shared pools of memory to store packets (e.g., if the private pool of memory is full). Scheduler 360 may also implement a memory management unit to dequeue packets from packet buffer 330 for final processing and egress. Scheduler 360 may provide the appropriate metadata for a packet to modifier 360. Although not illustrated in FIG. 3, packets from packet buffer 330 and packet metadata from scheduler 360 may be moved from ingress pipeline 302 to egress pipeline 304 via a crossbar. A crossbar may, for example, be implemented by one or more destination rings to transmit a network packet from the ingress pipeline 302 via egress pipeline 304 to a desired destination port.

Network packets that have passed through ingress pipeline 302 may be scheduled or released from packet buffer 330 for modification, reassembly and egress as part of egress pipeline 304. Packet modifier 370 may be implemented to modify packet headers based on the routing decisions made at the packet metadata determine by packet forwarding engines 340. For example, if tunneling is enabled for a packet, packet modifier 370 may create and insert the appropriate tunnel header in order to encapsulate at least a portion of the packet to implement a tunneling protocol. Packet modifier 370 may also perform modifications to other data in the packet header. Once the modified packet has been reassembled, egress unit to physical network interface 380 may utilize the physical layer (PHY) interface and the Ethernet Media Access Control (MAC) layer interface to transmit network packets as network data 392 via the appropriate physical connection (e.g., coaxial, twisted pair, or optical cable).

Figure 4:
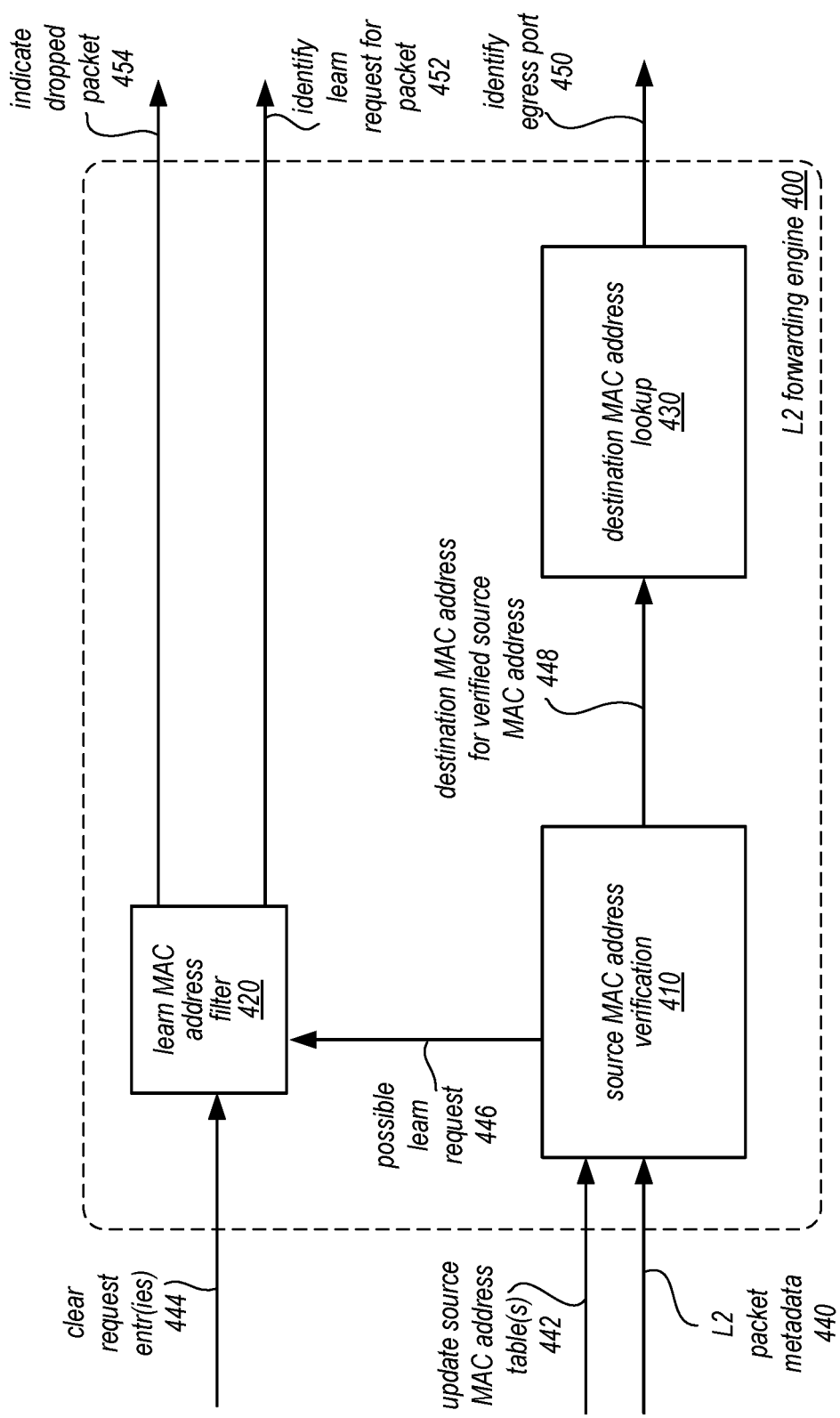
FIG. 4 is a logical block diagram illustrating a forwarding engine that utilizes filtering for control plane decision requests, according to some embodiments.

FIG. 4 is a logical block diagram illustrating a forwarding engine that utilizes filtering for control plane decision requests, according to some embodiments. In this example, the forwarding engine is a Layer 2 (L2) forwarding engine. Note however, that similar techniques, components, and functionalities could be implemented for other forwarding engines that rely upon control plane decisions, such as a Layer 3 (L3) forwarding engine.

L2 forwarding engine 400 may make forwarding decisions for network packets based on L2 information of the network packet, such as a source and destination MAC addresses included in the network packet. For example, in at least some embodiments, L2 forwarding engine 400 may implement source MAC address verification 410. Source MAC address verification 410 may perform one or more lookup operations with respect to a MAC address table to determine whether or not a source MAC address can be verified. For example, L2 packet metadata 440 for a network packet is received at source MAC address verification 410, which may determine whether the source MAC address in metadata 440 is known. If the source MAC address is known (e.g., a matching entry is found in a lookup operation to a source MAC address table, then the destination MAC address lookup may be performed, at destination MAC address lookup 430.

L2 forwarding engine 400 may implement destination MAC address lookup 430 to lookup a destination MAC address included in a network packet to determine a forwarding decision (e.g., an egress network interface port). As indicated at 448, destination MAC address for a verified source MAC address network packet may be provided to destination MAC address lookup 430 to perform a lookup operation with respect to a destination MAC address table. If a hit occurs, then the corresponding entry for the hit may identify an egress port 450.

For source MAC addresses that are not verified (e.g., source MAC addresses that are unknown or are associated with a different network interface port, "moved"), a possible learn request 446 may be indicated to learn MAC address filter 420. A learn request 446 may be a request message, indication, status, or any other form of communicating a learn request to a controller to make a control plane decision. In at least some embodiments, learn requests for a network packet may be indicated by writing, including, or otherwise identify a learn request (or other control plane decision request) in metadata for a network packet that is processed through an ingress pipeline, such as ingress pipeline 302 in FIG. 3.

L2 forwarding engine 400 may implement learn MAC address filter 420 to implement filtering of learn requests, as discussed below according to the techniques in FIGS. 5-7 below. For example, a source MAC address to be learned may be compared with entries in a learn filter cache (e.g., learn filter cache 500 in FIG. 5) to determine whether a learn request has already been sent for the same source MAC address). In some embodiments, a request limit may be enforced with respect to learn requests so that multiple learn requests for different network packets for the same source MAC address may be sent before blocking further learn requests for the source MAC address. In this way, learn requests that are lost, or for any other reason not acted upon or received by a controller, may be renewed by another learn request for the same source MAC address (up to the request limit).

For those requests possible learn requests that are filtered, an indication may be provided that indicates that the network packet should be dropped 454 (or may be forwarded according to procedures for sending network packets without identified source MAC addresses, such as flooding). For those learn requests that are not filtered, an indication maybe provided that identifies or otherwise allows a learn request to be made to the controller for the source MAC address on behalf of the packet, as indicated at 452. A new entry may be written or a current entry updated for the non-filtered learn request.

A controller, router, or other management process, such as may be implemented at a general processor (e.g., controller 360 in FIG. 3), may process learn requests for source MAC addresses. When a source MAC address is learned, the controller may update source MAC address table(s) 442 so that when source MAC address verification 410 receives another network packet that includes the source MAC address, the source MAC address for the other network packet is verified. In addition to updating the source MAC address tables, the controller may clear the request entry 444 in the learn filter cache so that other learn requests can be tracked in the learn cache filter. In at least some embodiments, the learn cache filter may periodically wiped (e.g., after a timeout event) to remove all entries.

Learn MAC address filter 420 may track, record, or otherwise maintain metadata describing those learn requests that have already been sent to controller 350 on behalf of network packets. FIG. 5 is a logical block diagram illustrating a filter cache for tracking learn requests, according to some embodiments. Learn filter cache 500 may, in some embodiments, be organized so that each network interface port, such as ingress ports 510, 520, etc., have the same number of cached learn requests that may be maintained. Additional learn requests that would be generated for network packets received via a network interface port that already has a full set of entries may be filtered, in some embodiments. In this way, the filter may not grow indefinitely. Learn request filtering may be enabled or disabled for each network interface port, in some embodiments, so that learn requests may be tracked for some network interface ports and not for other network interface ports. For example, a controller, such as controller 350 may enable or disable learn request filtering for individual network interface ports.

Learn filter cache 500 entries may include a valid bit, such as valid bits 512a, 512b, 522a, and 522b, which indicate whether an entry is still valid respectively. An invalid entry may be an entry available to be overwritten or otherwise used to track learn requests for a different source MAC address. Entries may also include a copy of the source MAC address being learned, such as source MAC addresses, 514a, 514b, 524a, and 524b. A filter cache hit or miss may be determined by comparing the source MAC addresses of the filter entries for a particular network interface port with the source MAC address of a network packet. An ingress port field, such as ingress port field 516a, 516b, 526a, and 526b, may identify a network interface port associated with the source MAC address (which may be used to identify whether or not a source MAC address has moved). Entries may also include a count of learn requests sent, such as learn request counts 518a, 518b, 528a, and 528b, which may be compared with a request limit and incremented if an additional learn request is sent.

Based on the entries described above with regard to FIG. 5, learn MAC address filter 420 may allow, deny, or perform other actions with respect to learn requests sent to controller 350. FIG. 6 is an action table for a learn filter, according to some embodiments. Learn filter actions table 600 describes different source MAC verification failures that can occur (e.g., unknown or moved), the various conditions with respect to a corresponding filter cache entry (e.g., learn filter hit, learn filter full, learn requests sent to the CPU less than the maximum, learning disabled, or a static MAC, and the responsive actions that learn MAC address filter 420 may perform. Please note that the following actions are provided as examples of various ways that a control plane decision request filter, such as learn MAC address filter 420, may rely upon a filter cache to filter control plane decision requests, and thus are not intended to be limiting.

For example, a first verification failure status illustrated is an unknown source MAC address error where a lookup operation to a source MAC table misses. In the case where learning is disabled for the network interface via which the network packet is received, then the network packet may be dropped or otherwise denied. However, in some instances, a learn request may be sent to the controller as filtering is disabled for the network interface. In the next example, the verification failure status is again an unknown source MAC address for the network packet. In this example learn request filtering for the network packet is enabled. Evaluating the learn cache filter detects a hit, that is an entry that contains the same unknown source MAC address already exists in the filter cache. If the number of requests already sent to the CPU is less than the maximum number of requests (which is true for this example), then another request may be sent, and thus a learn request to the controller may be allowed. Additionally, the learn count in the entry of the learn filter cache may be incremented. In some embodiments, requests to the may be sent be logging or trapping the network packet for evaluation by the controller. In the next example of an unknown source MAC address verification failure, the opposite scenario is presented, there is a learn filter hit, but the maximum number of requests has already been sent, therefore the network packet may be dropped or forwarded, blocking an additional learn request for the source MAC address.

In the next example, the source MAC address is again unknown, however no hit occurs in the filter cache. Moreover, the filter cache is not full. Therefore, a new entry may be made in the filter cache, recording the various entry information described above with regard to FIG. 5 (e.g., the valid field, source MAC address, setting the learn count to 1, etc.). Additionally, a request may be allowed to be sent to the controller to learn the source MAC address (as indicated by the action to log or trap the network packet for evaluation). In the opposite scenario, where there is no matching entry for the source MAC address but where the filter cache is full (e.g., for the particular network interface port via which the network packet is received), then no request may be sent, blocking a request to the CPU. Instead, the network packet may be dropped (or forwarded without determining a source MAC address match).

The next set of example scenarios described in table 600 illustrate actions performed with respect to source MAC address verification failure status where the receiving network interface port has "moved" or is different from a previous network interface port associated with the source MAC address. In the first example scenario, the source MAC address may be identified as static (which may be identified in the source MAC address table). For static source MAC addresses, the packet processor can expect that the network interface port is not to change, and therefore no learn request may be sent and the network packet dropped. The other example scenarios illustrated in table 600 are similar to those discussed above for unknown source MAC addresses. For instance, if no entry matches the source MAC address in the filter cache and the filter cache is not full then a new filter cache entry for the source MAC address may be written to the filter cache in addition to sending a learn request. For those scenarios where the filter cache is full or where the number of learn requests exceeds the maximum, then the network packet may be dropped or forwarded without sending a learn request, filtering the learn request.

The examples of filtering control plane decision requests as discussed above with regard to FIGS. 2-6 have been given in regard to a packet processor implemented as part of a networking device. Note that various other types or configurations of networking devices that implement packet processors or devices with packet processing pipelines may implement these techniques. Different types of forwarding engines than an L2 forwarding engine, such as an L3 forwarding engine, or other components that may send control plane decisions can implement such techniques. Moreover, different configurations of the various modules, components, or stages within a packet processor may utilize aggregations of common portions of forwarding routes. In addition to examples given above, the techniques discussed below with regard to FIGS. 7-8 may be also implemented using the various components discussed above as well as different types of systems or devices that perform packet processing.

Figure 7:
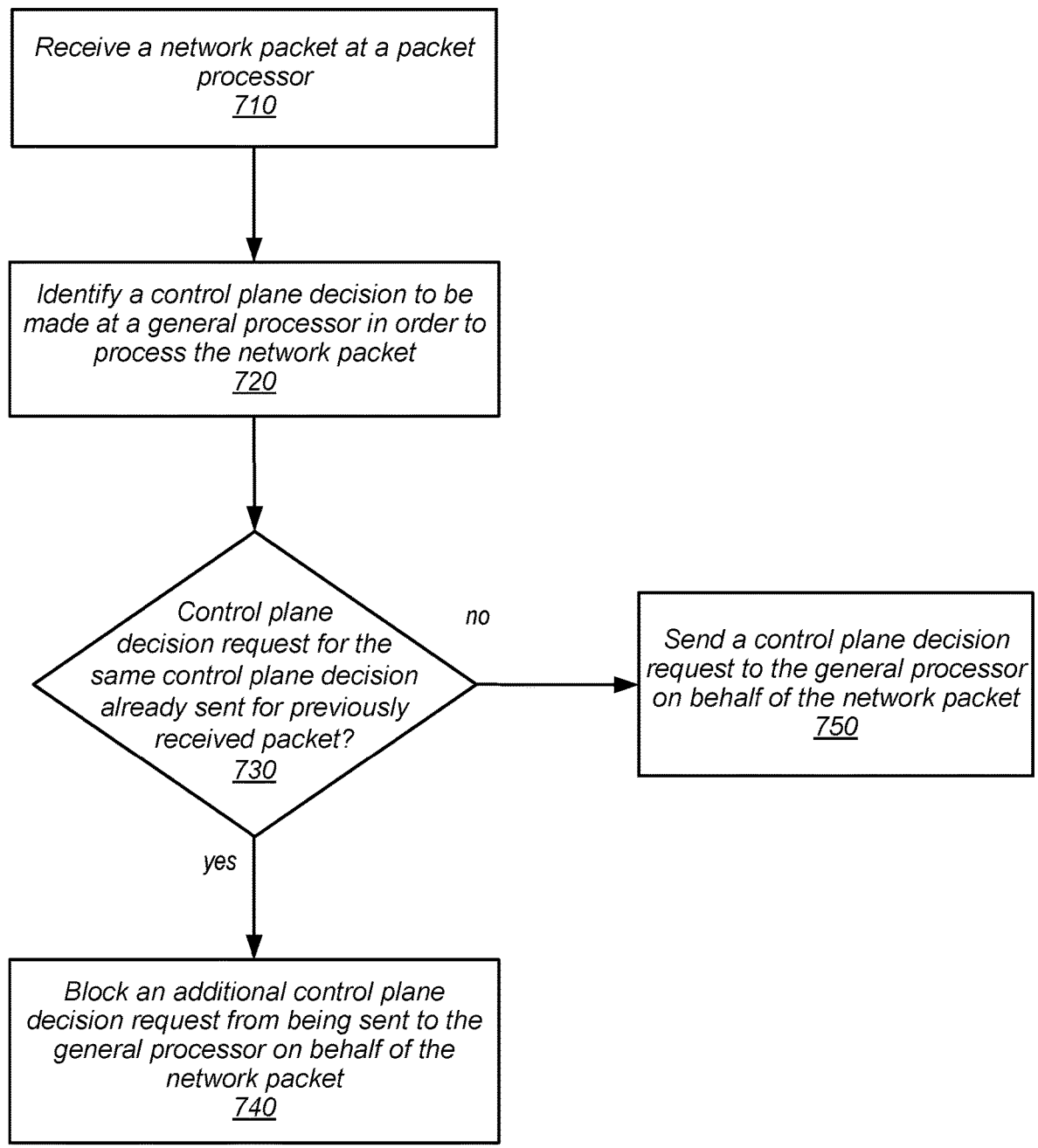
FIG. 7 is a high-level flowchart illustrating various methods and techniques to implement filtering control plane decision requests for forwarding network packets, according to some embodiments.

FIG. 7 is a high-level flowchart illustrating various methods and techniques to implement filtering control plane decision requests for forwarding network packets, according to some embodiments. As indicated at 710, a network packet may be received at a packet processor. Network packets may be a discrete portion of the stream of data transmitted over various types of network connections, such as twisted pair connections, coaxial connections, or fiber optic connections, or other wired or wireless connections formatted according to various transmission protocols to a destination address. A network packet may refer to a unit of data according to layer 3, the network layer, of the open systems interconnection (OSI) model for communications, in some embodiments, or to layer 2, the data-link layer. Layer 3 protocols may include, but are not limited to, protocols such as IP, internet control message protocol (ICMP), IP security (IPsec), routing information protocol (RIP), Border Gateway Protocol (BGP) and many others. Layer 2 protocols may include, but are not limited to, protocols or layers such as Address Resolution Protocol (ARP), Media Access Control (MAC), Link Aggregation Control Protocol (LACP), Open Shortest Path First (OSPF) or Spanning Tree Protocol (STP). Different types of network packets may also refer to the different layers of the Internet protocol suite.

A general processor may be a processor executing program instructions to implementing a routing process, management process, or other controller, such as the various actions described above by controller 360 in FIG. 3). As indicated at 720, a control plane decision to be made at the general processor may be identified in order to process the network packet. For instance, as discussed above with regard to FIGS. 4-6, a source MAC address for a network packet may be looked up with respect to a source MAC address table. If the source MAC address is not found, or is associated with a different network interface/port, then a control plane decision may need to be made to resolve the unknown source sending packets to the packet processor. Other decisions may need to be made for other types or issues that arise when processing network packets. For instance, multicast network packets that are formatted according to L3 may need to be identified in a lookup table as well. If the correct multicast entry is not located, then a control plane decision at the general processor may need to be performed in order to process the network packet.

Once a request is identified, a determination may be made as to whether a control plane decision request has already been sent for the control plane decision for a previously received network packet, as indicated at 730. In some embodiments, a filter cache (e.g., FIG. 5) or other tracking information maintained that identifies the outstanding or unresolved control plane decisions that have been sent to the general processor. In at least some embodiments, a request limit on the number of requests that may be sent (e.g., learn request count 518 in FIG. 5) may be enforced with respect to the same control plane decision. If an additional request for the identified control plane decision were sent increasing the number of requests sent to exceed the request limit, then it may be determined that a request has been sent, as indicated by the negative exit from 730. Thus, in some embodiments multiple control plane requests may be allowed up until the request limit for the same control plane decision. Such limitations could be configurable by the general processor, in some embodiments, so that the request limit could be increased or decreased as the burden on the general processor to perform control plane decisions increases or decreases. Request limitations may be different with respect to different types of control plane decisions (e.g., source MAC learn request limits may be higher than a request limit to handle an ARP packet).

For those control plane decisions that are identified as having at least one control plane request previously sent (or multiple ones such that the request would exceed a request limit), then as indicated at 740, an additional control plane decision request on behalf of the network packet may be blocked, in various embodiments. Additionally, in some embodiments, the network packet itself may be dropped or otherwise denied. However, in other embodiments, the network packet may be forwarded according to forwarding decisions that can be determined without the control plane forwarding decision (e.g., flooding the network packet out of every port). The responsive action taken for the network packet may depend on the type of packet or type of control plane decision (e.g., which for an unknown source MAC address may indicate that the flooding action mentioned in the example above may be performed).

Figure 8:
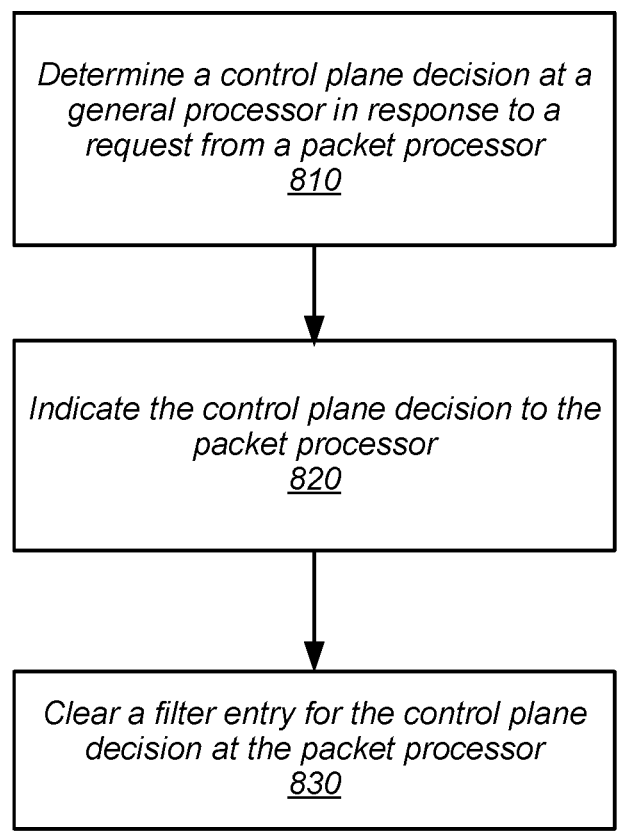
FIG. 8 is a high-level flowchart illustrating various methods and techniques to implement clearing a filter cache control plane decisions, according to some embodiments.

FIG. 8 is a high-level flowchart illustrating various methods and techniques to implement clearing a filter cache for control plane decision requests, according to some embodiments. As indicated at 810, a control plane decision may be determined at a general processor in response to a request from a packet processor, in various embodiments. As many different types of control plane decisions may be requested, the general processor may determine the control plane decision in different ways. To learn a source MAC address, for instance, the general processor may have to identify the MAC address of other network packets bound to the source MAC address in order to learn the source MAC address. Other techniques to handle other control plane decision requests, such as packets for L2 control protocol frame for STP, L2 control protocol for LACP, L3 control traffic for OSPF or BGP, or ARP broadcast packets, may be performed at the general processor.

The control plane decision may be indicated to the packet processor, as indicated at 820, in some embodiments. Control plane decisions may be indicated to the packet processor, in some embodiments, by writing the decision to lookup tables, control status registers, or other components which store data used to perform forwarding for a network packet. In the case where the control plane decision is a route, mapping, or association for an unknown or moved source MAC address, an entry for the source MAC address may be written to (or modified in) a lookup table for source MAC address. For changes to particular actions to be performed (e.g., in response to identify a network packet as a particular type of packet or a packet with a particular condition), control status registers may be changed so as to indicate a different action (e.g., change action from logging the particular packet to forwarding the packet to the general processor).

As indicated at 830, a filter entry for the control plane decision may be cleared at the packet processor, in various embodiments. For example, the entry in the cache may be marked or otherwise identified as available to track a new control plane decision. In some embodiments, the entry may be overwritten, reset, or data in the entry otherwise deleted.

In order to ensure that the filter cache does not grow full and never empty a timeout event for the filter cache may be detected and all of the filter cache entries may be cleared. In this way, control plane decision requests that may have never been received but are counted in the filter may not permanently consume a filter entry. Timeout events may occur periodically (e.g., every 5 minutes) or aperiodically (e.g., at times when traffic is light). A general processor may detect the timeout event and access the memory or other storage devices that maintain the filter cache and delete the current entries.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A networking device, comprising:
   a plurality of physical network interfaces;
   a general processor;
   a memory, storing program instructions that when executed by the general processor cause the general processor to implement a controller for a packet processor, wherein the packet processor and the general processor are separate processors;
   the packet processor, configured to:
     receive a network packet via one of the physical network interfaces;
     detect a source Media Access Control (MAC) address verification failure status for the network packet;
     in response to the detection of the source MAC address verification failure status:
       identify a learn request to be sent to the controller in order for the packet processor to process the network packet;
       determine that a separate outstanding learn request for the same source MAC address verification failure status has been sent to the controller for a previously received network packet; and
       in response to the determination that the separate outstanding learn request for the same source MAC address verification failure status has been sent, block the identified learn request from being sent to the controller on behalf of the network packet;
     determine whether different learn requests sent to the controller for different source MAC address verification failure status, including the same source MAC address verification failure status and the another source MAC address verification failure status, are less than a maximum number of outstanding learn requests;
     allow, based at least in part on the determination whether the different learn requests are less than the maximum number of outstanding learn requests, another learn request for another source MAC address verification failure status for another received network packet to be sent to the controller, wherein the another learn request for the another source MAC address verification failure status is identified when the separate outstanding learn request for the same source MAC address verification failure is unresolved, and with no separate outstanding learn request for the same another source MAC address verification failure status sent to the controller.

2. The networking device of claim 1, wherein to detect the source MAC address verification failure status for the network packet comprises:
   determine that a source MAC address for the network packet is unknown; or
   determine that the physical network interface via which the network packet was received is different than another one of the physical network interfaces associated with a source MAC address for the network packet.

3. The networking device of claim 1,
   wherein to determine that the separate outstanding learn request for the same source MAC address verification failure status has been sent to the controller for the previously received network packet, the packet processor is configured to determine whether a sending of the learn request would exceed a request limit for a number of attempts to send a learn request for the same source MAC address verification failure status;

wherein the packet processor is further configured to:
receive a further network packet;
detect a further source Media Access Control (MAC) address verification failure status for the other network packet;
in response to the detection of the further source MAC address verification failure status:
determine that a sending of an additional learn request for the further network packet does not exceed a request limit for a number of attempts to send a learn request for the same further source MAC address verification failure status; and
in response to the determination that the sending of the additional learn request for the further network packet does not exceed the request limit, allow the additional learn request to be sent to the controller.

4. The networking device of claim 3, wherein respective filter entries for different control plane decision requests sent to the controller for different control plane decisions including the control plane decision are maintained, wherein the determination that the sending of the additional learn request does not exceed the request limit for the number of attempts is based on an evaluation of the filter entries, wherein a filter entry for the further source MAC address verification failure status is not maintained in the filter entries, and wherein the packet processor is further configured to:
in response to the determination that the sending of the additional learn request for the further network packet does not exceed the request limit, write a new filter entry for the further source MAC address verification failure status.

5. A method, comprising:
receiving a network packet at a packet processor;
identifying, by the packet processor, a control plane decision to be made at a general processor in order for the packet processor to process the network packet, wherein the packet processor and the general processor are separate processors;
determining, by the packet processor, that an outstanding control plane decision request for the control plane decision has been sent to the general processor for a previously received network packet; and
in response to determining that the outstanding control plane decision request has been sent to the general processor for the control plane decision, blocking an additional control plane decision request for the control plane decision from being sent to the general processor on behalf of the network packet;
determining whether different control plane decision requests sent to the general processor for different control plane decisions, including the control plane decision and the another control plane decision, are less than a maximum number of outstanding control plane decision requests;
allowing, based at least in part on the determining whether the different control plane decision requests are less than the maximum number of outstanding control plane decision requests, another control plane decision request for another control plane decision with no other outstanding control plane decision requests to be sent to the general processor, wherein the another control plane decision request for the another control plane decision is sent when the outstanding control plane decision request for the control plane decision is unresolved.

6. The method of claim 5, wherein identifying the control plane decision to be made at the general processor in order to process the network packet comprises detecting a miss in response to a table lookup performed for the network packet.

7. The method of claim 5,
wherein the method further comprises maintaining, by the packet processor, a count of requests sent to the general processor for the control plane decision; and
wherein determining that the outstanding control plane decision request for the control plane decision has been sent to the general processor comprises determining that potentially sending the another control plane decision request on behalf of the network packet would increase the count of requests sent to the general processor beyond a request limit for the control plane decision.

8. The method of claim 5, further comprising:
receiving a further network packet at the packet processor;
identifying, by the packet processor, a further control plane decision to be made at the general processor in order to process the other network packet;
determining, by the packet processor, that a control plane decision request for the further control plane decision has not been sent to the general processor; and
in response to determining that the control plane decision request for the further control plane decision has not been sent to the general processor, allowing the further control plane decision request to be sent to the general processor on behalf of the other network packet.

9. The method of claim 5, further comprising:
in response to determining that the outstanding control plane decision request has been sent to the general processor for the control plane decision, performing an action with respect to the packet, wherein the action is identified in a control status register.

10. The method of claim 9, further comprising:
prior to receiving the network packet, programming, by the controller, the control status register to indicate:
a log action;
a trap action;
a forward action; or
a drop action.

11. The method of claim 5, further comprising:
maintaining, by the packet processor, respective filter entries for different outstanding control plane decision requests sent to the general processor for different control plane decisions including the control plane decision;
making, by the general processor, the control plane decision; and
upon making the control plane decision, clearing the filter entry for the control plane decision.

12. The method of claim 5, further comprising:
maintaining, by the packet processor, respective filter entries for different control plane decision requests sent to the general processor for different control plane decisions including the control plane decision;
in response to detecting a request timeout event, clearing the filter entries for the different control plane decision requests.

13. The method of claim 5, wherein the identifying, the determining, and the blocking are performed for network packets received via one of a plurality of network interface ports, wherein control plane decision requests on behalf of network packets received via another one of the network interface ports are not blocked by the packet processor.

14. A system, comprising:
a device configured to perform packet processing, the device comprising;
   a network interface configured to transmit and receive packets via a network connection to the device;
   a packet processing pipeline, configured to:
      receive a network packet via the network interface;
      evaluate the network packet to determine a forwarding decision for the network packet, wherein the evaluation identifies a control plane decision to be made at a controller in order for the packet processing pipeline to determine the forwarding decision for the network packet, wherein the device configured to perform packet processing and the controller are separate devices;
      determine that an outstanding control plane decision request for the control plane decision has been sent to the controller for a previously received network packet; and
      in response to the determination that the outstanding control plane decision request has been sent to the controller, block an additional control plane decision request from being sent to the controller on behalf of the network packet;
      determine whether different control plane decision requests sent to the controller for different control plane decisions, including the control plane decision and the another control plane decision, are less than a maximum number of outstanding control plane decision requests;
      allow, based at least in part on the determination whether the different control plane decision requests are less than the maximum number of outstanding control plane decision requests, another control plane decision request for another control plane decision with no other outstanding control plane decision requests to be sent to the controller, wherein the another control plane decision request for the another control plane decision is sent when the outstanding control plane decision request for the control plane decision is unresolved.

15. The system of claim 14, wherein, to determine that the outstanding control plane decision request for the control plane decision has been sent to the controller, the packet processing pipeline is configured to:
   access a filter entry for the control plane decision that includes count of requests sent to the controller for the control plane decision; and
   based on the count of request, determine that an allowance of the additional control plane decision request would exceed a request limit for the control plane decision.

16. The system of claim 15, wherein the controller is configured to:
   upon a determination of the control plane decision, clear the filter entry for the control plane decision.

17. The system of claim 14, wherein respective filter entries for different control plane decision requests sent to the controller for different control plane decisions including the control plane decision are maintained within the maximum, and wherein the packet processing pipeline is configured to:
   receive a further network packet via one of the network interfaces;
   evaluate the other network packet to determine a further forwarding decision for the further network packet, wherein the evaluation identifies another control plane decision to be made at the controller in order to determine the further forwarding decision for the further network packet;
   based on the filter entries, determine:
      that no other control plane decision request for the further control plane decision has been sent to the controller; and
      that no additional filter entry for the different control plane decision requests may be maintained within the maximum;
   in response to the determination that no other control plane decision request for the further control plane decision has been sent and that no additional filter entry may be maintained within the maximum, block an initial control plane decision request from being sent to the controller on behalf of the further network packet.

18. The system of claim 14, wherein the network packet is a Layer 3 (L3) packet.

19. The system of claim 14,
   wherein the system further comprises:
      a processor; and
      a memory, storing program instructions that when executed by the processor cause the processor to implement the controller for the packet processing pipeline;
   wherein the packet processing pipeline includes a control plane request filter that is configured to perform the determination that the outstanding control plane decision request for the control plane decision has been sent to the controller for a previously received network packet, and to block the additional control plane decision request;
   wherein the controller is configured to:
      prior to the receipt of the network packet, enable filtering at the control plane request filter, wherein filtering is only performed for network packets received via the network interface when filtering is enabled.

20. The system of claim 14, wherein the device is an application specific integrated circuit (ASIC), a system-on-chip (SoC), or a field-programmable gate array (FPGA).

* * * * *